United States Patent

Hirano

(10) Patent No.: US 12,215,739 B2
(45) Date of Patent: Feb. 4, 2025

(54) BALL JOINT

(71) Applicant: SOMIC MANAGEMENT HOLDINGS INC., Tokyo (JP)

(72) Inventor: Tomoya Hirano, Hamamatsu (JP)

(73) Assignee: SOMIC MANAGEMENT HOLDINGS INC., Tokyo (JP)

(*) Notice: Subject to any disclaimer, the term of this patent is extended or adjusted under 35 U.S.C. 154(b) by 381 days.

(21) Appl. No.: 17/792,671

(22) PCT Filed: Oct. 28, 2020

(86) PCT No.: PCT/JP2020/040433
§ 371 (c)(1),
(2) Date: Jul. 13, 2022

(87) PCT Pub. No.: WO2021/152941
PCT Pub. Date: Aug. 5, 2021

(65) Prior Publication Data
US 2023/0043146 A1    Feb. 9, 2023

(30) Foreign Application Priority Data
Jan. 29, 2020 (JP) .................. 2020-012667

(51) Int. Cl.
*F16C 11/06* (2006.01)
(52) U.S. Cl.
CPC ...... *F16C 11/0642* (2013.01); *F16C 11/0638* (2013.01); *F16C 11/068* (2013.01)
(58) Field of Classification Search
CPC .............. F16C 11/0619; F16C 11/0623; F16C 11/0628; F16C 11/0633; F16C 11/0638;
(Continued)

(56) References Cited

U.S. PATENT DOCUMENTS 3,554,586 A * 1/1971 Cutler ................. F16C 11/0638
403/140
3,787,127 A * 1/1974 Cutler ................. F16C 11/0638
403/140
(Continued)

FOREIGN PATENT DOCUMENTS

JP    S58189813 U    12/1983
JP    2003247525 A    9/2003
(Continued)

OTHER PUBLICATIONS

International Search Report issued in International Application No. PCT/JP2020/040433 dated Dec. 22, 2020.
(Continued)

*Primary Examiner* — Josh Skroupa
*Assistant Examiner* — Kevin J Baynes
(74) *Attorney, Agent, or Firm* — TROUTMAN PEPPER HAMILTON SANDERS LLP

(57) ABSTRACT

A ball joint reducing influence on a characteristic by fixing a plug by swaging while preventing corotation of a bearing sheet. The ball joint includes a housing-including a housing body part and the plug fixed to the housing body part at one end portion thereof by swaging and closing the housing body part at the one end portion. The ball joint includes the cylindrical bearing sheet rotatably holding a ball part and housed and held in the housing. The bearing sheet includes a groove formed at an end facing the plug. The plug includes a projection inserted into the groove. The height of the projection is less than the depth of the groove, the width of the projection is greater than the width of the groove, and the projection contacts the bearing sheet at a width smaller on an inner side than on an outer side relative to the groove.

4 Claims, 2 Drawing Sheets

(58) Field of Classification Search
CPC . F16C 11/0642; F16C 11/0657; F16C 11/661; F16C 11/068; F16C 11/106; Y10T 403/32336; Y10T 403/32361; Y10T 403/32655; Y10T 403/32786; Y10T 403/32795; Y10T 403/32803

See application file for complete search history.

(56) References Cited

U.S. PATENT DOCUMENTS

| | | | | |
|---|---|---|---|---|
| 4,720,205 | A | * | 1/1988 | Ito ................. F16C 11/0647 403/135 |
| 4,758,110 | A | * | 7/1988 | Ito .................... F16C 33/20 403/140 |
| 5,611,635 | A | * | 3/1997 | Schutt ............. F16C 11/0642 403/135 |
| 5,704,726 | A | * | 1/1998 | Nemoto ........... F16C 11/0652 403/132 |
| 5,855,447 | A | * | 1/1999 | Nemoto ............... F16C 7/02 403/135 |
| 6,019,541 | A | * | 2/2000 | Maughan .......... F16C 11/0685 403/135 |
| 6,164,861 | A | * | 12/2000 | Maughan .......... F16C 11/0638 403/135 |
| 6,190,080 | B1 | * | 2/2001 | Lee ................... F16C 11/0638 403/135 |
| 8,684,621 | B2 | * | 4/2014 | Forthaus .......... F16C 11/0638 403/135 |
| 9,518,602 | B2 | * | 12/2016 | Forthaus .......... F16C 11/0647 |
| 10,363,786 | B1 | * | 7/2019 | Parker ............... F16C 11/0642 |

FOREIGN PATENT DOCUMENTS

| | | |
|---|---|---|
| JP | 2008223946 A | 9/2008 |
| JP | 2010112417 A | 5/2010 |
| JP | 2015152153 A | 8/2015 |
| JP | 5970726 B2 | 8/2016 |
| JP | 2019078357 A | 5/2019 |
| KR | 101262625 B1 | 5/2013 |

OTHER PUBLICATIONS

Microfilm of the specification and drawings annexed to the request of Japanese Utility Model Application No. 86972/1982 (Laid-open No. 189813/1983) (Rhythm Motor Parts Manufacturing Co., Ltd.) Dec. 16, 1983 (Dec. 16, 1983). (Published as JPS58189813U).

Grant Decision issued in the corresponding Chinese Patent Application No. 202080085148.3 dated Apr. 11, 2024 (with English translation).

* cited by examiner

BALL JOINT

CROSS-REFERENCE TO RELATED APPLICATIONS

This application is a U.S. National Phase of International Patent Application No. PCT/JP2020/040433, filed on Oct. 28, 2020, which published as WO 2021/152941 A1 on Aug. 5, 2021, and claims priority to JP 2020-012667, filed on Jan. 29, 2020, all of which are herein incorporated by reference in their entireties.

TECHNICAL FIELD

This invention relates to a ball joint including a cylindrical sliding member made of synthetic resin housed and held in a receiving-side member.

BACKGROUND

In a steering device (steering mechanism) or a suspension device (suspension mechanism) of a vehicle, an automobile or the like, for example, a ball joint as a ball bearing is conventionally used. The ball joint includes a bearing sheet as a sliding member made of synthetic resin in which a ball part of a ball stud as a ball-side member made of metal is accepted. The vehicle is used in an environment widely ranging from a high-temperature region to a low-temperature region. In the low-temperature region, the synthetic resin configuring the bearing sheet shrinks to reduce preload (precompression), causing a risk of corotation of the bearing sheet with the ball part. In particular, the vehicle is expected to be used in a lower-temperature environment in recent years, and the risk of the corotation becomes higher in such a lower-temperature environment.

In a known configuration responsive to such corotation, a groove or a recess is formed at a bottom surface of the bearing sheet, and a projection or a protrusion to be fitted to the groove or the recess is formed at a bottom surface of an inner periphery of a housing facing the groove or the recess or at an inner side surface of a plug as a closing member closing a bottom of the housing, namely, at a surface on a ball part side (see PTL 1 and PTL 2, for example).

SUMMARY

Technical Problem

However, the above-described configuration requires the accuracy of each structure. For example, unless the projection or the protrusion to face the groove or the recess can be formed into a size appropriate for each other and can be fitted to the groove or the recess in such a manner as to form sliding contact therebetween, it becomes impossible to achieve intended performance sufficiently. Specifically, if the projection or the protrusion is too large for the groove or the recess, assembling performance is reduced. If the projection or the protrusion is too small for the groove or the recess, a clearance is formed to cause backlash.

Hence, a configuration unlikely to cause influence on the characteristic of a ball joint while preventing corotation of a bearing sheet is desired. This problem also occurs in a ball joint for a purpose other than a vehicle.

This invention has been made in view of such an issue, and is intended to provide a ball joint reducing influence on a characteristic by means of fixing of a closing member by swaging while preventing corotation of a sliding member.

Solution to Problem

A ball joint includes: a receiving-side member including a cylindrical receiving-side member body opened at both ends, and a closing member fixed to the receiving-side member body at one end portion thereof by swaging and closing the receiving-side member body at the one end portion; a cylindrical sliding member housed and held in the receiving-side member; and a ball-side member including a ball part rotatably held by the sliding member, wherein the sliding member includes a groove formed at an end portion facing the closing member, the closing member includes a projection inserted into the groove, the height of the projection is less than the depth of the groove, the width of the projection is greater than the width of the groove, and the projection contacts the sliding member at a width smaller on an inner side than on an outer side relative to the groove.

According to a ball joint, the receiving-side member body includes a receiver formed at a position closer to an opposite end of the receiving-side member body in such a manner as to extend along an inner surface in a direction crossing an axis direction, the sliding member includes a shoulder part butting on the receiver and formed at an end portion on the other side of the groove, and the projection is located at least partially on a virtual line passing through the shoulder part and extending in an axis direction of the sliding member.

According to a ball joint, the projection includes: small projections in a pair; and a large projection arranged between the small projections and higher than the small projections.

Advantageous Effects of Invention

According to the ball joint, as the projection can be fitted effectively to the groove through the swaging and deformation of the receiving-side member body, the sliding member can be held reliably while the sliding member is retained on the receiving-side member, thereby preventing corotation of the sliding member. Furthermore, even if the receiving-side member body is swaged and deformed excessively, load resulting from fixing of the closing member by swaging is less likely to be transmitted to the ball part through the sliding member, thereby reducing influence on the characteristic of the ball joint.

In addition to fulfilling the effect of the ball joint as recited above, load resulting from swaging and deformation of the receiving-side member body is transmitted effectively to the projection about a position of butting contact between the shoulder part and the receiver as a fulcrum, thereby allowing the projection to be fitted effectively to the groove.

In addition, the projection can be fitted effectively to the groove without increasing the size of the projection as a whole.

DETAILED DESCRIPTION

Figure 1:
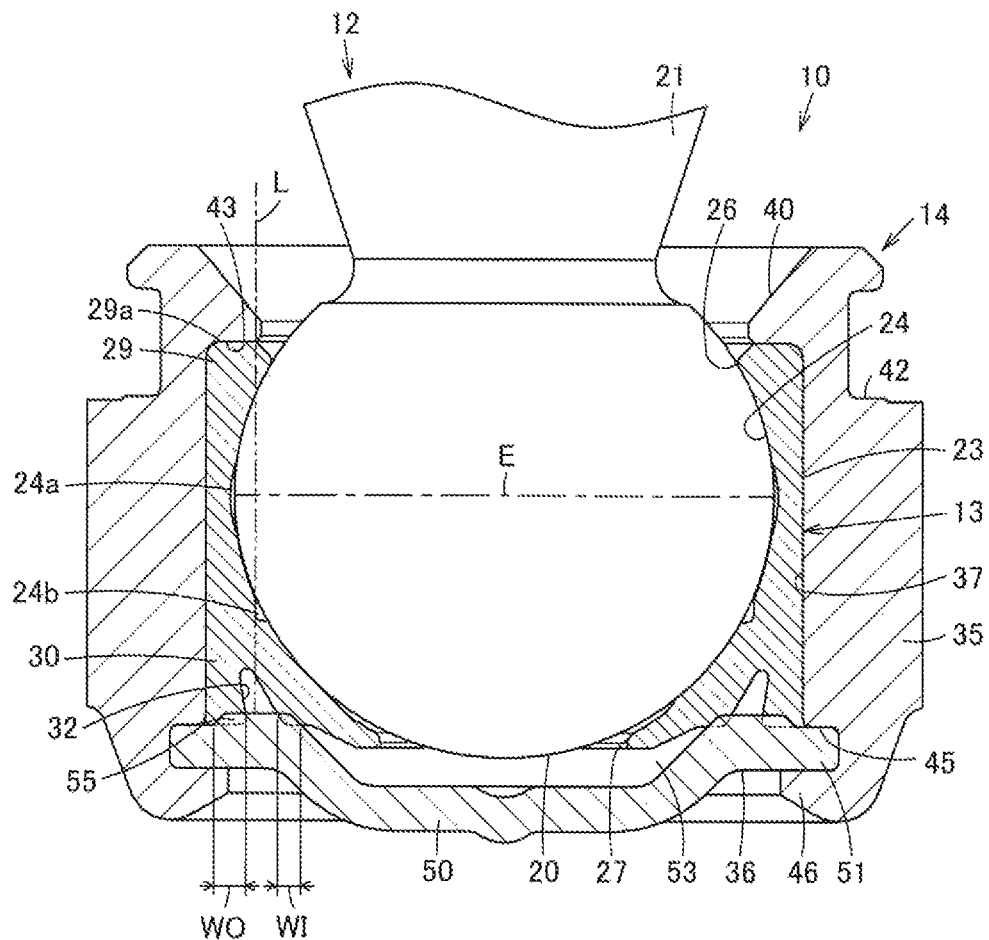
FIG. 1 is a sectional view showing a ball joint according to an embodiment of this invention.

An embodiment of this invention is described below by referring to the drawings.

Referring to FIG. 1, reference number 10 denotes a ball joint. The ball joint 10 is used in a suspension device or a steering device of an automobile, for example. An outer ball joint (OBJ) used in a steering device for coupling between the steering device and a knuckle arm of a suspension device is described as an example of the ball joint 10 of this embodiment.

The ball joint 10 includes a ball stud 12 as a ball-side member, a bearing sheet 13 as a sliding member (ball sheet), and a housing 14 as a receiving-side member. The ball joint 10 may include a dust cover not shown in the drawings.

The ball stud 12 has one end portion where a spherical ball part 20 is provided, and an opposite end portion where a stud part 21 like a shaft is coupled from the ball part 20. The ball stud 12 is made of steel, or the like. The ball stud 12 described below is based on a position where the ball stud 12 is in neutral (in a neutral state).

The ball part 20 is held by the bearing sheet 13 in such a manner that a part of an outer peripheral surface thereof is slidable or rotatable.

The stud part 21 is a part to be connected to an external connection target member not shown in the drawings and to receive load. The stud part 21 may be formed integrally with the ball part 20, or may be formed separately from the ball part 20 and then may be integrated with the ball part 20 by welding, or the like.

The bearing sheet 13 is formed into a circular cylinder using synthetic resin. The synthetic resin for forming the bearing sheet 13 is synthetic resin having excellent wear resistance and a high elastic modulus, for example. The bearing sheet 13 has an outer peripheral surface 23 like a circular cylindrical surface having a constant or substantially constant diameter dimension. The outer peripheral surface 23 of the bearing sheet 13 is held by the housing 14. The bearing sheet 13 has an inner peripheral surface 24 that is a sliding surface like a spherical surface extending along the outer peripheral surface of the ball part 20. The inner peripheral surface 24 of the bearing sheet 13 holds the ball part 20 in a certain region in an axis direction including at least an equator position E. The equator position E of the ball part 20 is a position on the outer peripheral surface of the ball part 20 where a diameter dimension is the largest as viewed in a section crossing or perpendicular to the axis direction corresponding to a direction between one end and an opposite end of the ball stud 12. The inner peripheral surface 24 of the bearing sheet 13 is formed in such a manner as to be gradually reduced in diameter dimension in an axis-perpendicular direction from a position adjacent to a center in the axis direction toward each of one end and an opposite end. If necessary, the inner peripheral surface 24 of the bearing sheet 13 may be given a groove, a recess, a protrusion, or the like. In the illustrated example, one peripheral groove 24a is formed continuously in a peripheral direction in such a manner as to extend over a region in the axis direction including a position where a diameter dimension in the axis-perpendicular direction is the largest, and a different peripheral groove 24b is formed continuously in the peripheral direction at a position separated from the one peripheral groove 24a in the axis direction. A lubricant (grease) is stored in these one and different peripheral grooves 24a and 24b.

The bearing sheet 13 has one end portion where one sheet opening part 26 is formed as one sliding member opening part, and an opposite end portion where an opposite sheet opening part 27 is formed as an opposite sliding member opening part. These one and opposite sheet opening parts 26 and 27 are each formed continuously at both end portions of the inner peripheral surface 24 of the bearing sheet 13. The one and opposite sheet opening parts 26 and 27 are each formed into a diameter dimension less than the diameter dimension of the ball part 20. In this embodiment, the diameter dimension of the opposite sheet opening part 27 is less than the diameter dimension of the one sheet opening part 26.

A shoulder part 29 as a butting part butting on the housing 14 in the axis direction is formed at the one end portion of the bearing sheet 13. The shoulder part 29 is a part surrounding the one sheet opening part 26. The shoulder part 29 is formed in such a manner as to extend toward the one sheet opening part 26 in the axis direction of the bearing sheet 13 and to jut out gradually toward a center axis of the bearing sheet 13. In this embodiment, the shoulder part 29 is formed in such a manner as to extend toward the one sheet opening part 26 in the axis direction of the bearing sheet 13 and to become thicker gradually in the axis-perpendicular direction. The shoulder part 29 has an end portion functioning as a butting surface 29a. The butting surface 29a is formed into a planar shape extending in the axis-perpendicular direction of the bearing sheet 13.

A load receiver 30 is formed at the opposite end portion of the bearing sheet 13. The load receiver 30 is a part surrounding the opposite sheet opening part 27. The load receiver 30 is a part receiving compressive load from the ball part 20 acting in a direction of the axis line of the ball stud 12. The load receiver 30 is formed in such a manner as to extend toward the opposite sheet opening part 27 in the axis direction of the bearing sheet 13 and to jut out gradually toward the center axis of the bearing sheet 13. The load receiver 30 juts out further toward the center axis of the bearing sheet 13 than the shoulder part 29.

A groove 32 is formed at the bearing sheet 13. The groove 32 is formed at an end portion of the bearing sheet 13 facing a plug 36 described later, namely, at the opposite end portion of the bearing sheet 13. In this embodiment, the groove 32 is formed at the load receiver 30. The groove 32 is opened in the axis direction of the bearing sheet 13. The groove 32 is formed in such a manner as to become narrower gradually from its opening end toward its back, namely, from a lower side toward an upper side of FIG. 1, specifically, in such a manner that its length in a radius direction of the bearing sheet 13 becomes smaller gradually. The groove 32 tilts outward in the radius direction of the bearing sheet 13 from its opening end toward its back. Furthermore, relative to a tangent plane to the inner peripheral surface 24 extending in the axis direction of the bearing sheet 13, the groove 32 is located on an inner side of the radius direction, namely, to be closer to the center axis of the bearing sheet 13 at least at a part of the opening end of the groove 32. In this embodiment, a plurality of the grooves 32 is formed at the bearing sheet 13, and these grooves 32 are arranged at an equal distance or at substantially equal distances from the center axis of the bearing sheet 13 and are arranged at an equal interval or at substantially equal intervals therebetween in a peripheral direction of the bearing sheet 13.

The housing 14 is also called a socket, or the like, and includes a housing body part 35 as a circular cylindrical receiving-side member body and the plug 36 as a closing member closing an end portion of the housing body part 35 that are integral with each other. An inner chamber 37 housing the bearing sheet 13 is formed in the housing 14 using the housing body part 35 and the plug 36.

In this embodiment, the housing body part 35 is a metallic part formed by forging or casting or the like, for example. The housing body part 35 is formed into a straight circular cylindrical shape having a constant or substantially constant inner diameter dimension and a constant or substantially constant outer diameter dimension. The housing body part 35 is arranged coaxially or substantially coaxially with the bearing sheet 13 housed in the inner chamber 37. The housing body part 35 is opened at both end portions including one end portion closed by the plug 36 and the opposite end portion functioning as an opening part 40 communicating with the one sheet opening part 26 of the bearing sheet 13 and with the outside of the housing 14. The opening part 40 may be formed into a shape expanding toward an outer side of the housing 14 (housing body part 35) in order to avoid interference between the stud part 21 and the housing 14 occurring when the ball stud 12 swings. Furthermore, the housing body part 35 may be provided with a cover fixing groove 42 at its outer peripheral surface functioning as a cover attachment part for fixing of a dust cover and formed at a position external to the opening part 40.

The housing body part 35 includes a receiver 43 with which the shoulder part 29 (butting surface 29a) of the bearing sheet 13 is in butting contact. The receiver 43 is formed at a position closer to the opposite end portion of the housing body part 35, namely, at a position on the other side of the plug 36 in such a manner as to extend along the inner surface of the housing body part 35 in a direction crossing or perpendicular to the axis direction, namely, in the axis-perpendicular direction. The receiver 43 is formed in such a manner as to extend over the inner peripheral surface and the opening part 40 of the housing body part 35. Namely, the receiver 43 is formed continuously over the inner peripheral surface and the opening part 40 of the housing body part 35.

The housing body part 35 includes a support 45 with which the plug 36 is supported. The support 45 is formed adjacent to the one end portion of the housing body part 35. The support 45 is formed into a groove at the inner peripheral surface of the housing body part 35 (inner chamber 37). The support 45 is formed continuously in a peripheral direction of the housing body part 35. The housing body part 35 includes a swaged part 46 formed at a position near the support 45 and used for fixing the plug 36 by swaging. The swaged part 46 is a part fixing an outer edge of the plug 36 supported by the support 45. The swaged part 46 is not deformed but extends in the axis direction of the housing body part 35 at the time of formation of the housing body part 35. In fixing the plug 36 to the housing body part 35, the swaged part 46 is swaged and deformed in such a manner as to collapse toward the center axis of the housing body part 35.

In this embodiment, the plug 36 is a metallic part formed by forging or casting or the like, for example. The plug 36 is arranged in the axis-perpendicular direction of the housing body part 35 and closes the one end portion of the housing body part 35. The plug 36 is a part located at a position facing the ball part 20 in the axis direction across the bearing sheet 13 and at which load applied from the ball stud 12 is largest at the housing 14. The plug 36 is arranged coaxially or substantially coaxially with the housing body part 35 and the bearing sheet 13. In this embodiment, the plug 36 includes a plug body part 50 as a closing member body closing the one end portion of the housing body part 35 to form the bottom of the housing 14, and a support target 51 located at an outer edge of the plug body part 50 that are integral with each other. In the illustrated example, the plug body part 50 like a circular plate is formed continuously in a recess shape at the center of the annular support target 51. A reservoir 53 storing the lubricant (grease) is formed between the plug body part 50 and an end portion of the bearing sheet 13. The support target 51 is held by the housing body part 35 by being supported by the support 45 and fixed by swaging using the swaged part 46.

The plug 36 includes a projection 55 for retaining the bearing sheet 13 on the housing 14. The projection 55 projects in a thickness direction of the plug 36. The projection 55 is formed longitudinally in a radius direction of the plug 36. Namely, the projection 55 is formed into a radial pattern. The projection 55 is formed at a position from the support target 51 to the plug body part 50. The projection 55 is located at a positon facing the groove 32 of the bearing sheet 13 and is inserted into the groove 32 while the plug 36 is fixed to the housing body part 35 by swaging. In this embodiment, a plurality of the projections 55 is formed at the plug 36 and these projections 55 are arranged at an equal distance or at substantially equal distances from the center of the plug 36 and are arranged at an equal interval or at substantially equal intervals therebetween in a peripheral direction of the plug 36. Each of the projections 55 is inserted into a corresponding one of the grooves 32. Namely, the number of the projections 55 may be the same as that of the grooves 32 or smaller than that of the grooves 32.

The projection 55 is formed in such a manner that an amount of projection, namely, a height from the plug 36 (support target 51) in the thickness direction is less than the depth of the groove 32. Thus, the projection 55 is inserted into a predetermined position of the groove 32 from the opening end of the groove 32. The projection 55 is formed into a width greater than the width of the groove 32. Here, the width of the projection 55 is the length of the projection 55 in the radius direction of the plug 36. The width of the groove 32 is the length of the opening end of the groove 32 in the radius direction of the bearing sheet 13. As a result, the projection 55 extends toward an inner side, namely, toward the center (toward the center axis) of the plug 36 in the radius direction and an outer side on the other side relative to the groove 32. Furthermore, the width of the projection 55 contacting the end portion of the bearing sheet 13, namely, the length of the projection 55 in the radius direction of the plug 36 (length in a right-left direction of FIG. 1) is smaller on the inner side than on the outer side relative to the groove 32. Specifically, a width WI of a region where the projection 55 contacts the bearing sheet 13 on the inner side (on the center side in the radius direction of the plug 36) relative to the groove 32 is less than a width WO of a region where the projection 55 contacts the end portion of the bearing sheet 13 on the outer side (on the outer side in the radius direction of the plug 36) relative to the groove 32.

Furthermore, the projection 55 is located at least partially on a virtual line L passing through the shoulder part 29 of the bearing sheet 13 and extending in the axis direction of the bearing sheet 13. The virtual line L is a line drawn from the innermost position of the shoulder part 29 parallel or substantially parallel to the center axis of the bearing sheet 13. In this embodiment, at least a part of the projection 55 fitted to the groove 32 is at a position overlapping the virtual line L. In the illustrated example, a section of the part of the projection 55 fitted to the groove 32 is on an outer side of the virtual line L, namely, on the outer side in the radius direction of the plug 36, and the other section of the part of the projection 55 fitted to the groove 32 is on an inner side of the virtual line L, namely, on the inner side in the radius direction of the plug 36 (on the center side of the plug 36). The projection 55 is located at least partially within a range of projection of the shoulder part 29 toward the axis direction of the bearing sheet 13. In the illustrated example, the range of projection of the shoulder part 29 toward the axis direction of the bearing sheet 13 is entirely laid across the projection 55.

Figure 2:
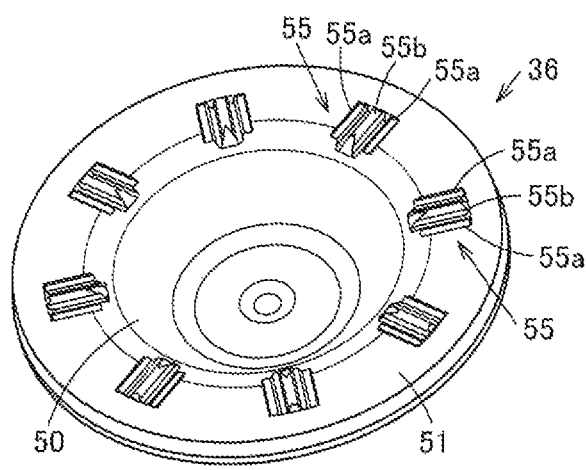
FIG. 2 is a perspective view showing a closing member of the ball joint.

The projection 55 may be formed freely as long as it satisfies the condition described above. In this embodiment, as shown in FIG. 2, the projection 55 includes small projections 55a, 55a in a pair, and a large projection 55b between the small projections 55a, 55a. The small projections 55a, 55a are separated from each other in the peripheral direction of the plug 36, and the large projection 55b is arranged between the small projections 55a, 55a. The height of the small projection 55a is half of the depth of the groove 32 (FIG. 1), for example. The height of the large projection 55b is greater than the height of the small projection 55a. Moreover, the width of the large projection 55b, namely, the length of the large projection 55b in the radius direction of the plug 36 is greater than the width of the small projection 55a, namely, the length of the small projection 55a in the radius direction of the plug 36. In the illustrated example, an outer position of the large projection 55b is aligned or substantially aligned with an outer position of the small projection 55a, and an inner position of the large projection 55b is located inward of the inner side of the small projection 55a. Each of the small projection 55a and the large projection 55b has a height less than the depth of the groove 32 (FIG. 1), has a width greater than the width of the groove 32 (FIG. 1), contacts the end portion of the bearing sheet 13 at a width smaller on the inner side than on the outer side relative to the groove 32 (FIG. 1), and is located at least partially on the virtual line L (FIG. 1).

A method of manufacturing the ball joint 10 according to one embodiment will be described next.

First, as an inserting step, the bearing sheet 13 with the inner peripheral surface 24 on which the ball part 20 is held is inserted into the housing body part 35 formed in advance, and the shoulder part 29 (butting surface 29a) is butted on the receiver 43. The stud part 21 may be formed in advance integrally with the ball part 20 or may be connected to the ball part 20 in a subsequent step by welding, or the like.

Next, as a supporting step, the support target 51 of the plug 36 formed separately is supported with the support 45 of the housing body part 35, and the projection 55 is caused to face the groove 32 of the bearing sheet 13. At this time, as the projection 55 is wider than the groove 32, the groove 32 is positioned within the width of the projection 55 independently of the dimension accuracies of the groove 32 and the projection 55.

In this state, as a swaging step, the swaged part 46 is swaged and deformed by a swaging unit, a roller or the like, not shown in the drawings toward the center axis of the housing body part 35. By doing so, the support target 51 of the plug 36 is caught between the swaged part 46 and the support 45 to fix the plug 36 to the housing body part 35 by swaging. At this time, as the groove 32 is positioned within the width of the projection 55, the projection 55 is fitted in such a manner as to penetrate uniformly or substantially uniformly into the groove 32.

As described above, by setting the height of the projection 55 less than the depth of the groove 32 and setting the width of the projection 55 greater than the width of the groove 32, the projection 55 can be fitted effectively to the groove 32 through the swaging and deformation of the swaged part 46 of the housing body part 35. This allows the bearing sheet 13 to be held reliably while the bearing sheet 13 is retained on the housing 14 (inner chamber 37), thereby preventing corotation of the bearing sheet 13.

In this embodiment, even if the swaged part 46 of the housing body part 35 is swaged and deformed excessively so load is applied excessively from the swaged part 46 to the plug 36, an area of contact of the projection 55 with the bearing sheet 13 is controlled in such a manner that the projection 55 contacts the end portion of the bearing sheet 13 at a width smaller on the inner side than on the outer side relative to the groove 32, thereby limiting the area of contact of the projection 55 with the bearing sheet 13 on the inner side closer to the ball part 20. Thus, load resulting from fixing of the plug 36 by swaging is less likely to be transmitted to the ball part 20 through the bearing sheet 13, thereby reducing influence on the characteristic of the ball joint 10.

Furthermore, as the projection 55 is present on the virtual line L passing through the shoulder part 29 of the bearing sheet 13, load resulting from swaging and deformation of the swaged part 46 of the housing body part 35 is transmitted effectively to the projection 55 about a position of butting contact between the shoulder part 29 and the receiver 43 as a fulcrum, thereby allowing the projection 55 to be fitted effectively to the groove 32.

Moreover, provision of the small projections 55a, 55a in a pair and the large projection 55b between the small projections 55a, 55a of the projection 55 allows the projection 55 to be fitted effectively to the groove 32 without increasing the size of the projection 55 as a whole.

The ball joint 10 is finished by performing a cover attaching step of attaching a dust cover, or the like, so as to extend over the ball stud 12 and the housing 14 after the swaging step, and by covering the opening part 40 with the dust cover.

In the above-described embodiment, the ball joint 10 is applicable not only to a steering device of a vehicle but also to a suspension device, for example, or other devices.

The above-described ball joint 10 is not limited to that for a vehicle but it is usable for any purpose.

INDUSTRIAL APPLICABILITY

This invention is preferably usable in a steering device or a suspension device for a vehicle, an automobile or the like, for example.

The invention claimed is:

1. A ball joint comprising:
a receiving-side member including a cylindrical receiving-side member body opened at both ends, and a closing member fixed to the receiving-side member body at one end portion thereof by swaging and closing the receiving-side member body at the one end portion;
a cylindrical sliding member housed and held in the receiving-side member; and
a ball-side member including a ball part rotatably held by the sliding member, wherein
the sliding member includes a groove formed at an end portion facing the closing member,
the closing member includes a projection inserted into the groove,
the height of the projection is less than the depth of the groove, the width of the projection is greater than the width of the groove, and the projection contacts the sliding member at a width smaller on an inner side than on an outer side relative to the groove.

2. The ball joint according to claim 1, wherein
the receiving-side member body includes a receiver formed at a position closer to an opposite end of the receiving-side member body in such a manner as to extend along an inner surface in a direction crossing an axis direction, the sliding member includes a shoulder part butting on the receiver and formed at an end portion on the other side of the groove, and the projection is located at least partially on a virtual line passing through the shoulder part and extending in an axis direction of the sliding member.

3. The ball joint according to claim 2, wherein the projection includes:

small projections in a pair; and a large projection arranged between the small projections and higher than the small projections.

4. The ball joint according to claim 1, wherein the projection includes:

small projections in a pair; and a large projection arranged between the small projections and higher than the small projections.

\* \* \* \* \*